(12) United States Patent
Aretz et al.

(10) Patent No.: US 6,978,140 B1
(45) Date of Patent: Dec. 20, 2005

(54) COMMUNICATIONS SYSTEM AND ASSOCIATED METHOD FOR IMPROVING THE SERVICE QUALITY THEREOF

(75) Inventors: Kurt Aretz, Isselburg (DE); Edgar Bolinth, Mönchengladbach (DE); Wolfgang Gröting, Oberhausen (DE); Ralf Kern, Bocholt (DE)

(73) Assignee: Siemens Aktiengesellschaft, Munich (DE)

( * ) Notice: Subject to any disclaimer, the term of this patent is extended or adjusted under 35 U.S.C. 154(b) by 294 days.

(21) Appl. No.: 10/398,109

(22) PCT Filed: Sep. 29, 2000

(86) PCT No.: PCT/DE00/03438

§ 371 (c)(1),
(2), (4) Date: Mar. 31, 2003

(87) PCT Pub. No.: WO02/28136

PCT Pub. Date: Apr. 4, 2002

(51) Int. Cl.[7] .............................. H04Q 7/20; H04B 7/00
(52) U.S. Cl. ........................................ 455/444; 455/507
(58) Field of Search ............................ 455/11.1, 444, 455/507, 517; 370/338, 349

(56) References Cited

U.S. PATENT DOCUMENTS

| | | | |
|---|---|---|---|
| 6,134,587 A | | 10/2000 | Okanoue |
| 6,141,533 A | * | 10/2000 | Wilson et al. ............ 455/11.1 |
| 6,477,353 B1 | * | 11/2002 | Honda et al. ............. 455/11.1 |
| 6,591,382 B1 | * | 7/2003 | Molloy et al. ............ 714/704 |
| 6,606,482 B1 | * | 8/2003 | Wheeler .................... 455/11.1 |
| 6,647,244 B1 | * | 11/2003 | Haymond et al. ........ 455/11.1 |
| 6,665,521 B1 | * | 12/2003 | Gorday et al. ............. 340/7.2 |
| 6,721,305 B1 | * | 4/2004 | Chan et al. ............... 370/349 |
| 6,775,258 B1 | * | 8/2004 | van Valkenburg et al. .. 370/338 |

FOREIGN PATENT DOCUMENTS

| | | |
|---|---|---|
| EP | 1 009 182 | 6/2000 |
| WO | WO 99/11081 | 3/1999 |

OTHER PUBLICATIONS

Patent Abstracts of Japan JP 10 155184 Jun. 9, 1998, (abstract).

* cited by examiner

*Primary Examiner*—Benny Quoc Tieu
(74) *Attorney, Agent, or Firm*—Bell, Boyd & Lloyd LLC

(57) ABSTRACT

A communication system and associated method are provided, wherein a quality of service is detected in the communication system, coordination reorganization is performed in order to reorganize coordination functionalities for available stations in the communication system, the previous two steps are repeated for various coordination organizations in the communication system, the various qualities of service detected in the various coordination organizations are analyzed, and a coordination organization is selected on the basis of this analysis, whereupon communication is affected with an external communication system which uses the same transmission medium as the communication system.

6 Claims, 2 Drawing Sheets

COMMUNICATIONS SYSTEM AND ASSOCIATED METHOD FOR IMPROVING THE SERVICE QUALITY THEREOF

BACKGROUND OF THE INVENTION

The present invention relates to a communication system and associated method for improving its quality of service, and particularly to a communication system and an associated method when there is a jointly used transmission medium.

Such a communication system and associated method are disclosed in WO 99/11081 A, where a number of subscriber stations in a mobile radio network are provided and can each perform either a master function or a slave function. The functions are distributed over the subscriber stations by evaluating quality-of-service measurements in the mobile radio system.

A significant escalation in, by way of example, cordless communication systems means that, in the future, the case will frequently arise that two or more independent communication systems use the same transmission medium, such as frequency bands. This can result in interference or even in one or more of these communication systems failing.

When using, by way of example, two communication systems which operate on the basis of the same transmission method or transmission format (e.g., DECT), the standards stipulate methods for avoiding such interference. These conventional methods are known, by way of example, by the term dynamic channel allocation. This allows interference and collisions between independent communication systems to be prevented to a certain degree.

Particularly when using independent communication systems which operate on the basis of different transmission methods and use a common transmission medium, such as Bluetooth, HomeRF, Powerline Communications (PLC), etc., interference which is sometimes considerable arises which can even result in one type of communication system failing. With a jointly used transmission medium, such as the ISM frequency band (Industrial, Scientific, Medical), in which a large number of communication systems can operate up to a predetermined transmission level, there therefore can be a high level of interference or incomplete utilization of the resources of the jointly used transmission medium. To be more precise, by way of example, a communication system can no longer work, or can work only inadequately, in a jointly used transmission medium in which, by way of example, microwaves, radio remote controls, babyphones and the like are also operating.

The present invention is, therefore, directed toward a communication system and associated method for improving its quality of service which are simple and expensive to achieve.

SUMMARY OF THE INVENTION

Particularly, the use of coordination changeover switches in a base station and in at east some further stations in the communication system for changing over various coordination functionalities, a quality-of-service detection apparatus for detecting a quality of service in the communication system and an analysis apparatus for analyzing the quality of service, with the coordination changeover switches being controlled on the basis of the analysis performed, allows an optimum quality of service to be achieved in the communication system and allows interference signals to be evaded.

Preferably, the quality-of-service detection apparatus or the analysis apparatus can detect or analyze a transmission quality for transmission resources split in the space domain, in the time domain and/or in the domain of frequency or code. This allows not just optimum spatial coverage to be provided in the communication system, but also optimum adjustment in line with any interference signals arising in predetermined time or frequency domains.

In addition, at least some of the stations can have an external transmission interface for implementing data transmission with external communication systems, which allows consultation to be instigated between different communication systems for the purpose of improving a respective quality of service.

Additional features and advantages of the present invention are described in, and will be apparent from, the following Detailed Description of the Invention and the Figures.

DETAILED DESCRIPTION OF THE INVENTION

Figure 1:
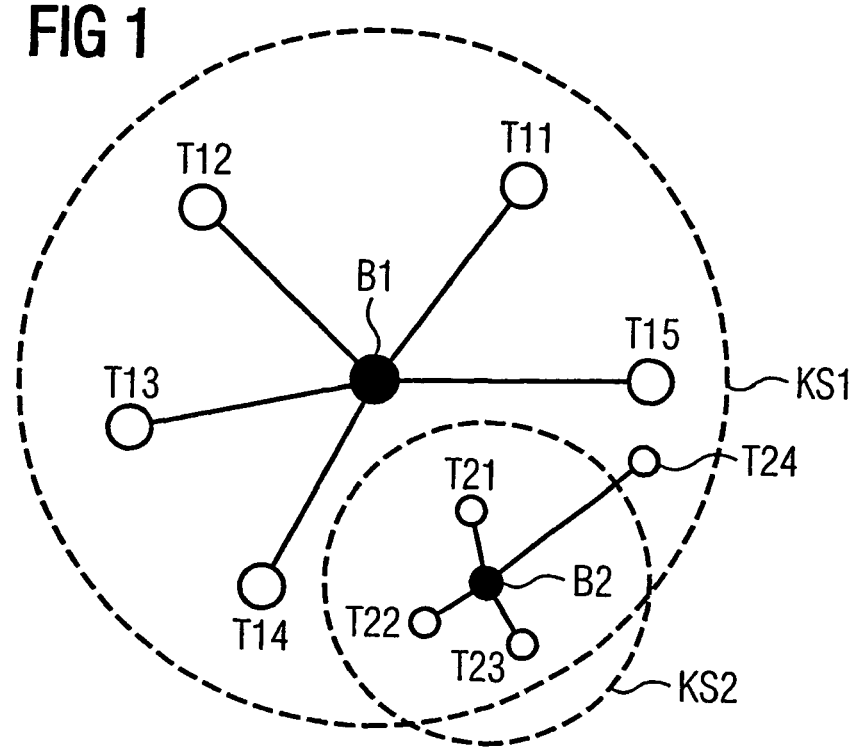
FIG. 1 shows a simplified illustration of a communication network having two communication systems with no improvement of a quality of service.

FIG. 1 shows a simplified illustration of a communication network having two communication systems KS1 and KS2 which use a common transmission medium. Examples of such communication systems are, by way of example, systems such as Bluetooth, HomeRF, IEEE 802.11, etc. However, the present invention is not limited thereto, but instead similarly covers wired communication systems, such as line-connected multicarrier systems known as Home-PNA, PLC, etc. In all these systems, a common transmission medium can be used by a large number of independent communication systems.

In line with FIG. 1, the communication system KS1 has a base station B1 with a point/multipoint connection to further stations T11 to T15. In a cordless application, such further stations are the mobile subscriber terminals, for example. A dashed line in FIG. 1 denotes a maximum communication range for a respective communication system. In line with FIG. 1, a further communication system KS2 with a shorter range is situated within the range of the communication system KS1. The communication system KS2, in turn, has a base station B2 and a large number of further stations or mobile subscriber terminals T21 to T24.

In the case of the communication network having communication systems with no improvement of a quality of service, as shown in FIG. 1, a situation first arises in which the base station B1 in the communication system KS1 cannot hear or detect the communication system KS2 due to the latter's short range. Conversely, however, by way of example, the base station B2 or the master in the communication system KS2 can identify the communication system KS1 and can detect that its quality of service is impaired due to interference. In the extreme case, this situation results in the communication system KS2 being affected by interference from the communication system KS1 such that it is sometimes not capable of operation. In addition, in the situation shown in FIG. 1 with no improvement of a quality of service, the case arises that a station T24 is situated outside the range of the communication system KS2 and is thus not included, or is included only with a very poor quality of service.

A quality of service (QoS) is understood, in line with the present invention, to mean essentially a transmission quality for communication links separated into a time domain, a frequency domain, a code domain, a space domain, etc., for a jointly used transmission medium. The transmission quality can be determined as a bit error rate, for example. To be more precise, a quality of service in a time domain refers to a transmission quality being provided over a maximum period. If there is, by way of example, an interference signal whose effect is limited over time, then a quality of service in the time domain can be improved by virtue of the time domains which are not affected by interference being used optimally for transmission. In the same way, a quality of service in the frequency domain relates to a transmission quality in predetermined bandwidth channels or carriers in a jointly used transmission medium. A quality of service in the frequency domain can be improved, by way of example, by virtue of the frequency domain of the interference signal being cut out and only carriers or channels which are not affected by interference being used for transmission. Finally, a quality of service in a space domain relates to a transmission quality in a space domain of the whole communication system, with a maximum coverage or an optimum transmission quality being attempted for all available stations. In addition, a quality of service can be improved by virtue of a communication system having a way of communicating with external communication systems, and this instigating consultation for the purpose of improving a quality of service in a whole communication network.

To improve a quality of service in the space domain, the base station and at least some of the further stations T21 to T24 have a coordination changeover switch for changing over a respective coordination functionality between participating stations. By way of example, such a coordination functionality for improving a quality of service in the space domain can be a point/point or point/multipoint connection in the respective stations of the communication system. To be more precise, at least some of the stations in the communication system KS2 thus have the ability to operate either as a "master" or as a "slave". In line with FIG. 1, the base station B2 first provides a point/multipoint connection or a master in the communication system KS2, while the further stations T21 to T24 have point/point connections.

In addition, the communication system KS2 has a quality-of-service detection apparatus which is preferably located directly in the stations and, by virtue of interchange with all stations, for example, ascertains a respective quality of service for a particular coordination functionality for a whole communication system KS2. In the situation shown in FIG. 1, such a quality-of-service detection apparatus will detect an impaired quality of service (in the space domain), since the station T24 is situated outside the range of the communication system KS2. In addition, there is a high level of interference due to the higher-level communication system KS1.

To improve a quality of service at least in the communication system KS2, coordination reorganization is therefore performed systematically or randomly for the communication system KS2. To be more precise, each station T21 to T24 is switched, for example successively, to a point/multipoint-connection coordination functionality or a "master mode" and a respective quality of service is detected in the communication system KS2. Following repeated performance of this coordination reorganization and associated quality-of-service detection, the detected qualities of service are finally analyzed by an analysis apparatus and, on the basis of the analysis result, the coordination organization which allows the best quality of service or best spatial coverage is selected.

Figure 2:
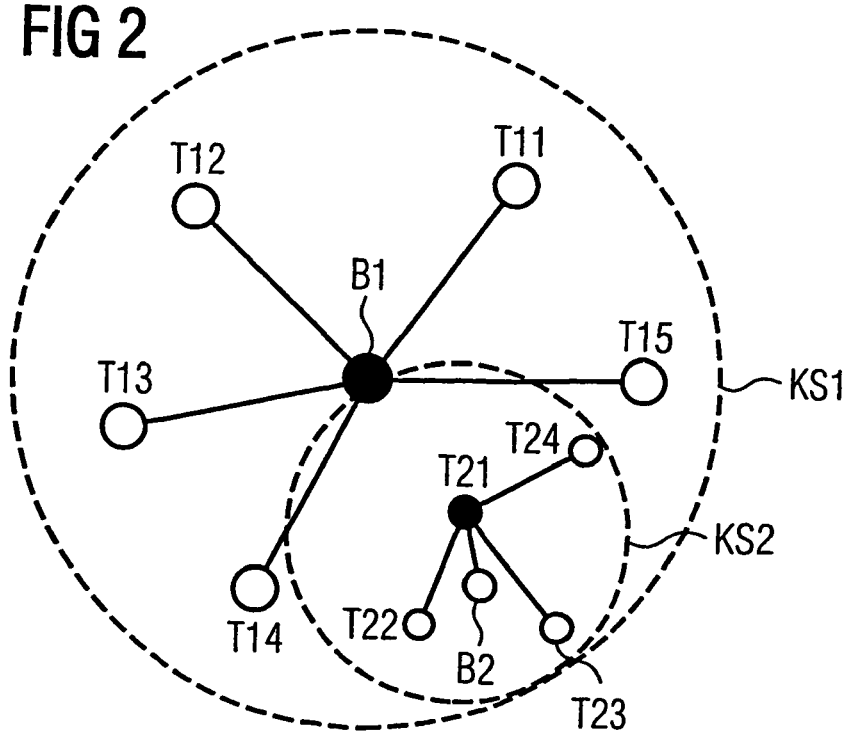
FIG. 2 shows a simplified illustration of a communication network having two communication systems following improvement of a quality of service in line with a first exemplary embodiment.

In line with FIG. 2, such an improvement in the quality of service (e.g., in the space domain), is obtained as a result of a coordination organization in which one station T21 now operates as a point/multipoint connection or master and the other stations T22 to T24 and the earlier base station B2 work as point/point connections or slaves. In this way, it is possible to shift the range of the communication system KS2 such that it is now also possible to reach the station T24, which gives maximum spatial coverage for all the stations in the communication system KS2. In addition, moving the master from the base station B2 to the station T21 provides contact with the base station B1 in the communication system KS1, however, which now provides this communication system with knowledge of the existence of a further communication system for the first time. Although one quality of service (transmission quality) in the communication system KS 2 is impaired due to increased interference by the communication system KS 1, the advantage of such an active strategy is that the communication system KS1, provided that it is an intelligent system, now implements an appropriate evasion strategy and, by way of example, reduces a transmission level or the range of the communication system to a minimum. This allows a quality of service or a transmission quality to be significantly improved in a whole communication network KS1 and KS2, since a quality of service in the communication system KS2 has now been significantly improved without impairing the quality of service in the communication system KS1.

Figure 3:
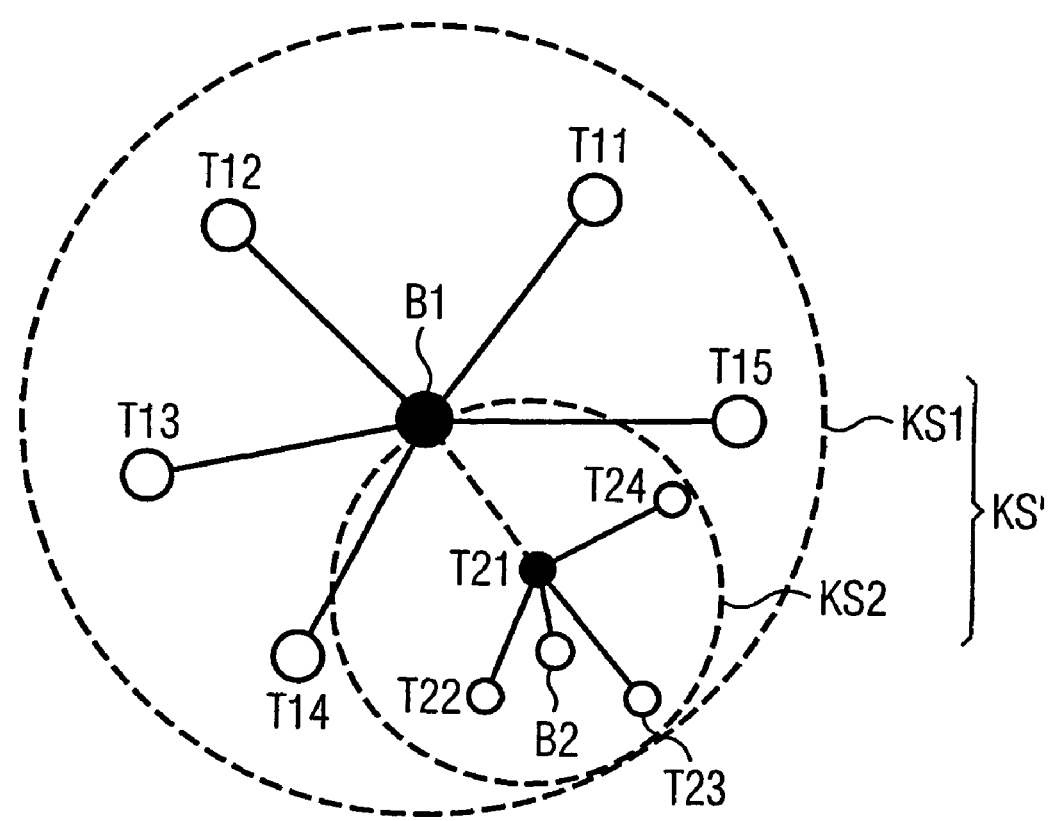
FIG. 3 shows a simplified illustration of a communication network having two communication systems following improvement of a quality of service in line with a second exemplary embodiment.

In line with FIG. 3, following improvement of a quality of service, a second exemplary embodiment allows not only the spatial coordination reorganization implemented in FIG. 2 but also setup of external communication between the communication system KS1 and the communication system KS2. To implement such data transmission with external communication systems, each station additionally has an external transmission interface besides an internal transmission interface for implementing data transmission within the communication system, which allows consultation to take place between the two communication systems. In the course of such consultation, the jointly used transmission medium now can be split in the space domain, in the time domain, in the code domain and/or in the frequency domain such that a respective optimum quality of service or transmission quality is obtained for the communication systems KS1 and KS2. In this context, it is fundamentally true that a communication system is more robust the more free parameters there are for implementing an evasion strategy.

If the communication system KS1 is a "frequency hopper", for example, then quality of service in the time domain can be improved, by way of example, by virtue of analysis of the temporally recurrent frequency jumps in the communication system KS1 being succeeded by the communication system KS2 following the system KS1 with a time delay, which prevents collision at all times. In this case, it is possible to use both the same frequency domain (bandwidths or carriers) and identical space domains.

In the same way, such a communication system and the associated method for improving its quality of service also can react to problematic sources of interference, such as microwaves, babyphones, radio remote controls and the like. The systematic detection and analysis of the sources of interference or of the qualities of service obtained allow the inventive communication system and the associated method to be used to develop an evasion strategy such that an available spectrum in a jointly used transmission medium is utilized in optimum fashion, and both more robust and more reliable communication systems are produced.

The invention has been described above with reference to a cordless communication system. It is not limited thereto, however, and instead comprises all other communication systems, such as line-connected multicarrier systems, which use a jointly used transmission medium.

Indeed, although the present invention has been described with reference to specific embodiments, those of skill in the art will recognize that changes may be made thereto without departing from the spirit and scope of the present invention as set forth in the hereafter appended claims.

What is claimed is:

1. A communication system, comprising:
   at least one base station;
   at least one further station, wherein at least one of the base station and at least one of the further stations have a coordination changeover switch for changing over a coordination functionality between participating stations;
   a quality-of-service detection apparatus for detecting a quality of service in the communication system; and
   an analysis apparatus for analyzing the detected quality of service in the communication system, wherein the coordination changeover switch is controlled based on the analysis performed, and at least some of the further stations have an external transmission interface for implementing data transmission with an external communication system, the external communication system and the communication system being designed to use a common transmission medium.

2. A communication system as claimed in claim 1, wherein the quality-of-service detection apparatus and the analysis apparatus detect and analyze a transmission quality for transmission resources split in at least one of a space domain, a time domain, a domain frequency and a domain of code.

3. A method for improving a quality of service in a communication system, the method comprising the steps of:
   detecting a quality of service in a communication system;
   performing coordination reorganization to reorganize coordination functionalities for available stations in the communication system;
   repeating the steps of detecting and performing for various coordination organizations in the communication system;
   analyzing various qualities of service detected in the various coordination organizations; and
   selecting a coordination organization based on the step of analyzing, whereupon communication is effected with an external communication system which uses a same transmission medium as the communication system.

4. A method for improving a quality of service in a communication system as claimed in claim 3, wherein the step of selecting a coordination organization is based on a quality of service which is one of best and worst.

5. A method for improving a quality of service in a communication system as claimed in claim 3, wherein the quality of service is a transmission quality for transmission resources in at least one of a time domain, a frequency domain, a code domain and a space domain of a jointly used transmission medium.

6. A method for improving a quality of service in a communication system as claimed in claim 3, wherein selection of the coordination organization is based on setting a coordination functionality for at least one of a time domain, a frequency domain, a code domain and a space domain for available stations.

* * * * *